Sept. 15, 1959 H. A. R. DE MIRANDA ET AL 2,904,758

CIRCUIT ARRANGEMENT FOR CONVERTING IMPEDANCES

Filed Oct. 8, 1956 2 Sheets-Sheet 1

INVENTOR
HEINE ANDRIES RODRIGUES DE MIRANDA
THEODORUS JOANNES TULP

BY Fred M. Vogel
AGENT

Sept. 15, 1959 H. A. R. DE MIRANDA ET AL 2,904,758

CIRCUIT ARRANGEMENT FOR CONVERTING IMPEDANCES

Filed Oct. 8, 1956 2 Sheets-Sheet 2

INVENTOR

HEINE ADRIES RODRIGUES DE MIRANDA
BY THEODORUS JOANNES TULP
Fred M. Vogel
AGENT

United States Patent Office 2,904,758

Patented Sept. 15, 1959

2,904,758

CIRCUIT ARRANGEMENT FOR CONVERTING IMPEDANCES

Heine Andries Rodrigues de Miranda and Theodorus Joannes Tulp, Eindhoven, Netherlands, assignors, by mesne assignments, to North American Philips Company, Inc., New York, N.Y., a corporation of Delaware

Application October 8, 1956, Serial No. 614,657

Claims priority, application Netherlands October 14, 1955

13 Claims. (Cl. 333—80)

This invention relates to circuit arrangements for converting impedances, comprising a known combination of an n-p-n transistor and a p-n-p transistor having their collectors and bases connected together in a cross-wise manner. It has for its object to provide circuit arrangements which permit of converting impedances so that the impedances realised are substantially independent of the characteristic magnitudes of the transistors used.

The circuit arrangement according to the invention may for example be employed as a negative resistance with or without reactive component in damping reducing line amplifiers. It may also be useful in other applications, for example in the technique of filter-circuits.

One may rightfully speak of conversion of impedances since, as it will be apparent from the further description, the impedance realized by means of the circuit arrangement of the invention is mainly dependent only on the impedance-elements of which this circuit arrangement partly consists. The impedance realized is equal to the reciprocal value of one of the said impedance elements multiplied by the proportion of two other impedance elements, and it is independent, within wide limits, from the parameters of the employed transistors and from the bias voltages applied thereto.

Up to the present and with the conventional available means, such a conversion was not possible, and the circuit arrangement of the invention may therefore very well become a valuable construction element in numerous and unforeseen applications.

The circuit arrangement according to the invention is characterized in that it comprises a first group of two pairs of terminals, of which one pair is connected between the positive pole of a supply voltage source and the emitter of the p-n-p transistor and the other pair is connected between the negative pole of said source and the emitter of the n-p-n transistor, and also a second group of two pairs of terminals, of which one pair is included between the source of supply and the base of the p-n-p transistor and the other is included between the source of supply and the base of the n-p-n transistor, passive impedances being connected to three of said four pairs of terminals, whereby the arrangement exhibits, across the fourth pair of terminals, a converted impedance substantially independent of the characteristic magnitudes of the transistors.

In order that the invention may be readily carried into effect, it will now be described, by way of example, with reference to the accompanying drawings, in which.

Figures 1, 2, 3:
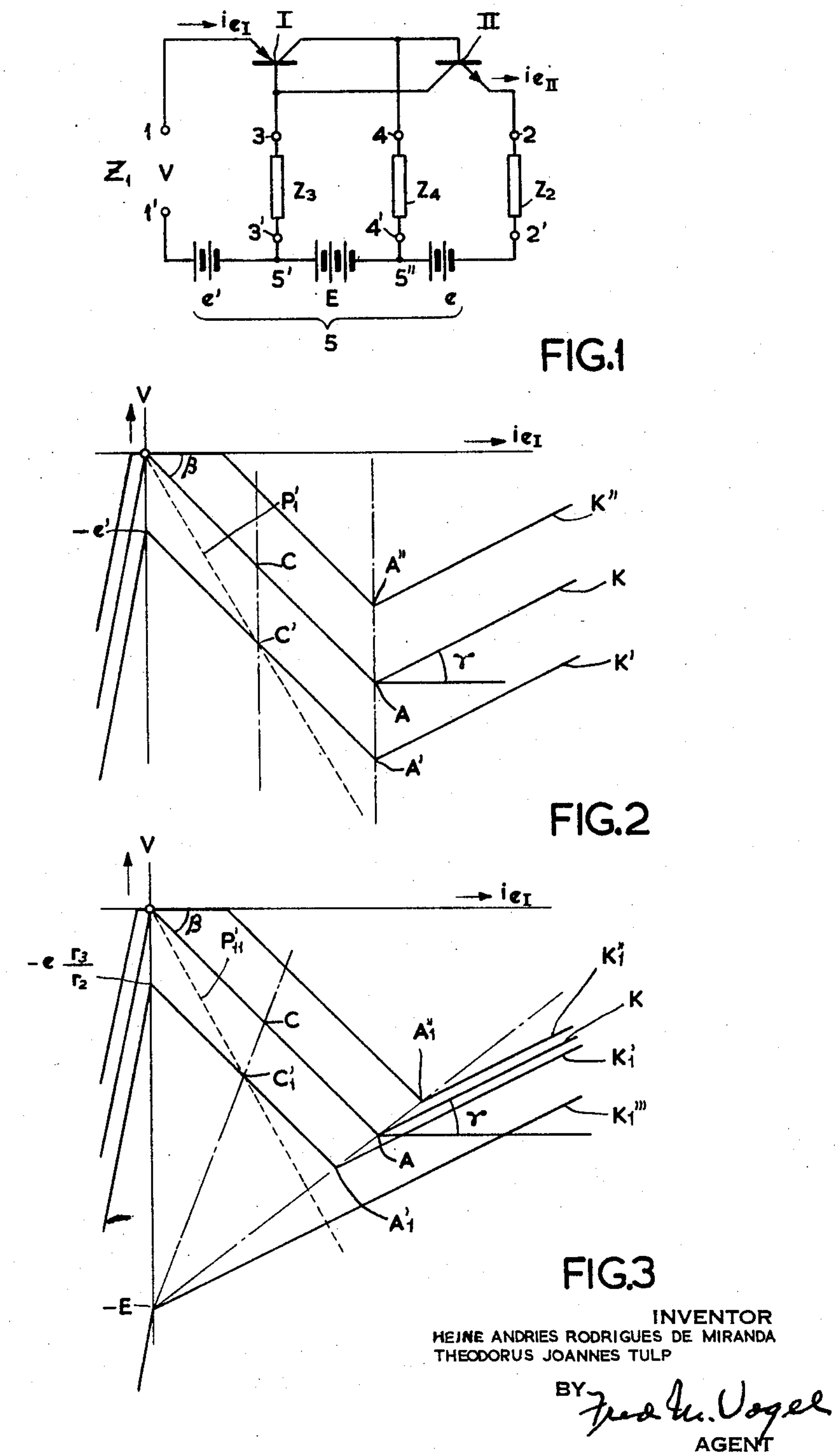
Fig. 1 shows a wiring diagram of the circuit arrangement according to the invention.
Figs. 2 and 3 show corresponding characteristic curves.

The circuit arrangement shown in Fig. 1 comprises a p-n-p-transistor I and an n-p-n-transistor II having their collectors and bases connected together in a cross-wise manner, the base of the p-n-p-transistor I being directly connected to the collector of the n-p-n-transistor II and the collector of the transistor I being directly connected to the base of transistor II. The circuit arrangement has a first group of two pairs of terminals, of which one pair 1—1' is included between the positive pole of a supply voltage source 5 and the emitter of the p-n-p-transistor I and the other pair 2—2' is included between the negative pole of the supply source 5 and the emitter of the n-p-n transistor II. It also comprises a second group of two pairs of terminals, of which one pair 3—3' is included between the supply source 5 and the base of transistor I and the other pair 4—4' is included between the supply source 5 and the base of transistor II. The supply source 5 has two tappings 5' and 5'', which are connected to the terminals 3' and 4', respectively. The supply voltage is divided into three portions $e'$, E and $e$ by said tappings. In practice the tappings are usually replaced by a voltage divider, the battery or voltage-divider portions being shunted with respect to alternating voltages by means of capacitors.

Passive impedances $z_2$, $z_3$ and $z_4$ are connected between the pairs of terminals 2—2' and 3—3' and 4—4', respectively so that the arrangement exhibits, across the fourth pair of terminals 1—1, a converted impedance substantially independent of the characteristic magnitudes of the transistors I and II, as will be explained hereinafter.

The emitter currents $i_{eI}$ and $i_{eII}$ of the circuit are dependent upon the emitter-base voltages $V_{ebI}$ and $V_{beII}$ as follows:

$$i_{eI}=S_I V_{ebI} \text{ and } i_{eII}=S_{II} V_{beII}$$

wherein $S_I$ and $S_{II}$ are the direct-current input admittances of the transistors I and II, respectively.

The voltages $V_{ebI}$ and $V_{beII}$ are equal to:

$$V_{ebI}=V+e'+z_3[\alpha_{II} i_{eII}-(1-\alpha_I) i_{eI}]$$

$$V_{beII}=-i_{eII} z_2+e+z_4[\alpha_I i_{eI}-(1-\alpha_{II}) i_{eII}]$$

wherein $\alpha_I$ and $\alpha_{II}$ are the emitter-collector current gain factors of the transistors I and II respectively. By elimination of $i_{eII}$, $V_{ebI}$ and $V_{beII}$ one finds:

$$V=i_{eI}\frac{1}{S_I}+z_3(1-\alpha_I)-\frac{z_3 z_4 \alpha_I \alpha_{II}}{\frac{1}{S_I}+z_4(1-\alpha_{II})+z_2} -e'-\frac{e z_3 \alpha_{II}}{\frac{1}{S_{II}}+z_4(1-\alpha_{II})+z_2}$$

Now, $\alpha_I$ and $\alpha_{II}$ are substantially equal to unity and substantially constant, but $(1-\alpha_I)$ and $(1-\alpha_{II})$ vary naturally much more strongly.

If the impedance set up between the terminals 1—1' must be independent of the characteristic magnitudes $S_I$ and $S_{II}$ of the transistors and of $(1-\alpha_{II})$, the terms $$\frac{1}{S_I} \text{ and } z_3(1-\alpha_I)$$

must be small with respect to the term $$\frac{z_3 z_4 \alpha_I \alpha_{II}}{\frac{1}{S_{II}}+z_4(1-\alpha_{II})+z_2}$$

Furthermore, the terms $$\frac{1}{S_{II}} \text{ and } z_4(1-\alpha_{II})$$

must also be small with respect to $z_2$, so:

$$\frac{1}{S_{II}} \ll z_2 \quad z_4(1-\alpha_{II}) \ll z_2$$

from which:

$$\frac{z_2}{z_4} \gg (1-\alpha_{II}) \text{ or } \frac{z_2}{z_4} \gg \frac{1}{\alpha'_{II}}$$

wherein $\alpha'_{II}$ is the base-collector current gain factor of the transistor II.

The term $$\frac{z_3 z_4 \alpha_I \alpha_{II}}{\frac{1}{S_{II}} + z_4(1-\alpha_{II}) + z_2}$$

is substantially equal to $$\frac{z_3 z_4}{z_2}$$

This term must be much larger than $$\frac{1}{S_I} \text{ and } z_3(1-\alpha_I)$$

so $$\frac{1}{S_I} \ll \frac{z_3 z_4}{z_2}$$

from which $$\frac{1}{S_I} \ll Z_1$$

wherein $Z_1$ is the impedance which the circuit exhibits in a network connected to the terminals 1 and 1'.

$$z_3(1-\alpha_I) \ll \frac{z_3 z_4}{z_2} \text{ or } \frac{z_4}{z_2} \gg (1-\alpha_I)$$

from which $$\frac{z_2}{z_4} \ll \alpha'_I$$

The quotient of the two passive impedances $$\frac{z_2}{z_4}$$

connected to the emitter and the base of the same transistor must thus be large with respect to the reciprocal of the base collector current gain factor $\alpha'_{II}$ of this transistor, but must be small with respect to the base-collector current gain factor $\alpha'_I$ of the other transistor.

The other conditions $$\left(\frac{1}{S_I} \ll \frac{z_3 z_4}{z_2} \text{ or } \frac{1}{S_{II}} \ll |Z_1| \text{ and } \frac{1}{S_{II}} \ll z_{II}\right)$$

imply that the absolute values of the impedance produced across the first pair of terminals 1—1' and of the passive impedance across the second pair of terminals 2—2' of the first group of pairs of terminals must be high with respect to the emitter-base input resistance of the corresponding transistor.

Under these conditions $$V = -\frac{z_3 z_4}{z_2} i_{e_I} - e' - \frac{z_3}{z_2} e$$

and $$Z_1 = \frac{dV}{di_{e_I}} = -\frac{z_3 z_4}{z_2}$$

from which it also follows that $z_1$ and $z_2$, on the one hand, and $z_3$ and $z_4$, on the other hand, are interchangeable. $Z_1$ is thus actually a converted impedance which is equal to the opposite of the product $z_3 z_4$ of the two passive impedances $z_3$ and $z_4$ connected to the two pairs of terminals 3—3' and 4—4' of the same group, divided by the third passive impedance $z_2$.

Fig. 2 shows, in the event that the passive impedances $z_2$, $z_3$ and $z_4$ are resistors $r_2$, $r_3$ and $r_4$ and that $e=e'=0$, the entire characteristic curve K of the voltage V on the terminals 1—1' of the circuit as a function of $i_{e_I}$. The left-hand portion of this characteristic curve, for $i_{e_I}$ smaller than 0, is the cut-off curve of the transistor I.

At right-hand side thereof, the characteristic curve shows a region of negative resistance $R_1$, wherein $$R_1 = -\frac{r_3 r_4}{r_2} = \tan\beta$$

This range is limited by saturation of the transistors; the current $i_{e_I}$ cannot become greater than in accordance with the equation $$i_{e_I} = \frac{V+E}{r_4}$$

wherein under the previously stated conditions, $$V = -i_{e_I}\frac{r_3 r_4}{r_2}$$

From this is found for the limit point A of Fig. 2:

$$i_{e_{IA}} = \frac{E}{r_4\left(1+\frac{R_3}{r_2}\right)}$$

and $$V_A = \frac{-E}{1+\frac{r_2}{r_3}}$$

At the right-hand side of this point, the terminals 1, 2, 3 and 4 may be regarded as if they were interconnected. The resistors $r_3$, $r_4$ and $r_2$ are then traversed by a current $$i_3 = \frac{V}{r_3}$$

a current $$i_4 = \frac{V+E}{r_4}$$

and a current $$i_2 = \frac{V+E}{r_2}$$

respectively.

The total current $i_{e_I} = i_2 + i_3 + i_4$ is thus:

$$i_{e_I} = V\left(\frac{1}{r_2} + \frac{1}{r_3} + \frac{1}{r_4}\right) + E\left(\frac{1}{r_2} + \frac{1}{r_4}\right)$$

from which is also found the slope $$\tan\gamma = \frac{V}{i_{e_I}}$$

of this last portion of the characteristic curve $$\gamma = \frac{r_2 r_3 r_4}{r_2 r_3 + r_2 r_4 + r_3 r_4}$$

If $e'$ is more or less than zero, the whole characteristic curve is shifted downwards or upwards by the value of $e'$. Thus, for example, such a shifted characteristic K' extends in Fig. 2 through the point ($i_{e_I}=0$, $V=-e'$) and through a point A'

$$\left(i_{e_I} = \frac{E}{r_4\left(1+\frac{r_3}{r_2}\right)}\right), V = -e' - \frac{E}{1+\frac{r_2}{r_3}}$$

The optimum load resistance $$P'_1 = \frac{V}{i_{e_I}}$$

corresponds to a straight line passing through the zero point and centrally intersecting the negative resistance portion of the characteristic curve:

$$P'_1 = \frac{R_4[r_3 E + 2(r_3+r_2)e']}{r_2 E} = -R_1 + \frac{2r_4(r_3+r_2)e'}{r_2 E}$$

$P'_1$ approximates the value of $R_1$ the better as $e'$ is smaller and the stability condition is $|P'_1| > |R_1|$. The circuit-arrangement is thus open circuit stable.

If $e' < 0$, the characteristic (K'') is flattened, since the transistor II is conducting only when $i_{e_{II}}$ is positive. Now, $$i_{e_{II}} \cdot r_3 = e' + i_{e_I} r_4 \frac{r_3}{r_2}$$

and the negative resistance portion of the characteristic thus begins at $$e' + i_{e_I} \frac{r_4 r_3}{r_2} > 0$$

or $$i_{e_I} > \frac{-e' r_2}{r_4 r_3}$$

Fig. 3 shows two similarly shifted characteristic curves $K'_1$ and $K''_1$ for $e'=0$ and $e>0$ and $e<0$ respectively. The abscissa of the limiting points $A'_1$ and $A''_1$ of the shifted characteristics are now no longer equal to the abscissa of the point A. The coordinates of a point $A'_1$, corresponding to a given value of $e$ are:

$$i_{e_I} = \frac{E - e\frac{r_3}{r_2}}{r_4\left(1 + \frac{r_3}{r_2}\right)}$$

and $$V = \frac{-r_3(E+e)}{r_2 + r_3}$$

The points A, $A'_1$, $A''_1$ etc. are located on the straight line $V = ir_4 - E$, whilst the optimum working points are located on the line $$V + E = i\frac{r_4}{r_2}(2r_2 + r_3)$$

and the optimum load resistance is $$P'_{11} = \frac{r_3 r_4 (E+e)}{Er_2 - er_3}$$

For $e<0$ the characteristic curve $K''_1$ is likewise flattened at the top (as far as point $$\left. i_{e_I} = -\frac{e}{r_4} \right)$$

its negative resistance portion disappearing at $$e\frac{r_3}{r_2} \geq E$$

so that the circuit arrangement starts operating as a diode polarised in the forward direction (characteristic $K'''_1$ of Fig. 3).

When use is made of a positive biasing potential $e$, a biasing potential $e'$ is not necessary and $e'$ is chosen to be zero. This is advantageous, for example, in cases in which it would be troublesome to connect a biasing potential source to the terminals 1—1' or 2—2' in series with the load impedance of the circuit arrangement.

The stability condition for the circuit arrangement shown in Fig. 1 is: $r_1 r_2 > r_3 r_4$.

In other words, and provided a correct biasing potential $e$ or $e'$ is used, the circuit arrangement exhibits a converted impedance between the terminals 1 and 1' or 2 and 2' and is open circuit stable with respect to $Z_1$ and $Z_2$ If a passive impedance is connected between the terminals 1 and 1' the arrangement exhibits a converted impedance $$Z_3 = -\frac{z_1 z_2}{z_4}$$

or $$Z_4 = -\frac{z_1 z_2}{z_3}$$

between the terminals 3 and 3' or 4 and 4', whereby $r_3 r_4$ must remain smaller than $r_1 r_2$, so that the circuit in this case is short-circuit stable. For complex passive impedances the stability condition of the open circuit stable or short-circuit stable circuit changes to the condition that the expression $z_1 z_2 - z_3 z_4$ must have no zero point in the negative resistance region, the stability condition for real passive impedances holding good for the zero frequency, so that this condition must at any rate be fulfilled.

Figure 4:
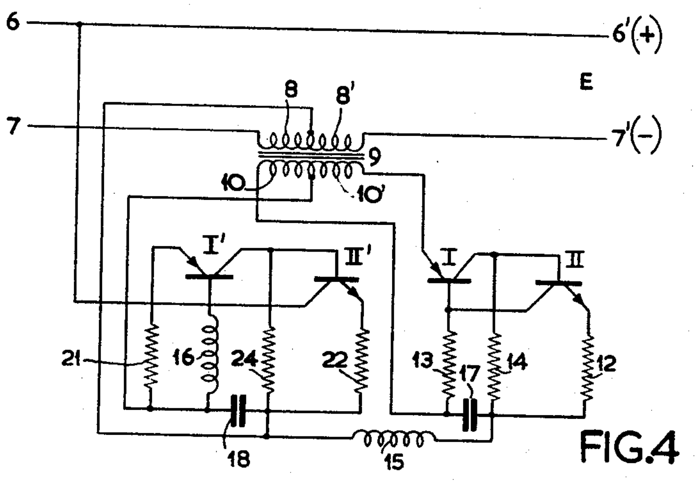
Fig. 4 shows the diagram of a line amplifier comprising two circuit arrangements according to the invention.

Fig. 4 shows a damping reducing line amplifier comprising two negative resistors connected in bridged T-connection, which are realised by means of circuit arrangements according to the invention.

The negative conductor 7—7' of the line 6—6', 7—7' includes the primary winding 8—8' of a push-pull transformer 9. An open circuit stable circuit arrangement exhibiting a negative resistance is connected to the secondary winding 10—10' of transformer 9. This circuit comprises a p-n-p-transistor I and an n-p-n-transistor II having their bases and collectors connected together in a cross-wise manner and three passive impedances 12, 13 and 14, which are realised by resistors. It is fed via centre tappings on the primary and secondary windings 8—8' and 10—10' of transformer 9 and via choke coils 15 and 16 by the direct voltage E set up between the line conductors 6—6' and 7—7'. A capacitor 17 bridges the positive and negative points of supply with respect to the signal voltage.

A second circuit arrangement exhibiting a short-circuit stable negative resistance is connected between the conductor 6—6' and the tapping on the primary winding 8—8' of transformer 9. This circuit operates as a transverse element and comprises a p-n-p-transistor I' and an n-p-n-transistor II' having their bases and collectors interconnected in a crosswise manner and three passive impedance 21, 22 and 24, which are realized by resistors. It is fed via the centre tapping on the winding 8—8' and via the choke coil 16, by the direct voltage E set up between the conductors 6—6' and 7—7'. A capacitor 18 bridges the positive and negative points of supply with respect to signal voltages.

Let it be assumed that the parameters of the transistors are the following: emitter-collector current gain factor $\alpha_I = 0.96$; base resistance $r_{b_I} = r_{b_{II}} = 150\Omega$; emitter resistance $r_{e_I} = r_{e_{II}} = 35\Omega$ and collector resistance $r_{c_I} = r_{c_{II}} = 1M\Omega$, then $$\frac{1}{S_I} = \frac{1}{S_{II}} = 35 + 150\frac{10^6.0.04 + r_b}{10^6 + r_c}$$

wherein the load resistance $r_b$ is identical with $r_4$ and $r_3$, respectively. Under the condition that $$r_b \ll r_c, \ \frac{1}{S} = 35 + 150 \times 0.04 = 35 + 6 = 41\Omega -$$

This condition is fulfilled if $r_3 \leqslant 0.1\ M\Omega$ and $r_4 \leqslant 0.1\ M\Omega$. Then we find: $r_2 >> 41\ \Omega$, for example $r_2 = 500\ \Omega$. From the conditions $$\frac{r_2}{r_4} 1 - \alpha_I, \ \frac{r_2}{r_4} \ll \frac{1}{1 - \alpha_{II}} \text{ and } \frac{r_3 r_4}{r_2} \gg \frac{1}{S_I}$$

we find: $r_2 = 500\ \Omega$ and $r_4 = 200\ \Omega$ $r_3 \geqslant 1250\ \Omega$ or $r_2 = 500\ \Omega$ and $r_4 = 1250\ \Omega$ $r_3 \geqslant 200\ \Omega$ from which $$R_1 = -\frac{1250 \times 200}{500}$$

to $$\frac{1250 \times 100.000}{500} = -500\ \Omega \text{ to } -0.25\ M\Omega \text{ and } R_3 = -200\ \Omega \text{ to } -0.1\ M\Omega$$

It will thus not be difficult to match the line amplifier shown in Fig. 4 to a given length of line having a determined damping.

If, in the circuit arrangement shown in Fig. 1, several or all of the passive impedances $z_2$, $z_3$ and $z_4$ are reactive impedances, the arrangement exhibits interesting impedances. It is necessary, of course, to maintain the conditions $$\frac{1}{a'_{\mathrm{I}}} \ll \frac{z_2}{z_4} \ll a'_{\mathrm{II}} : \frac{1}{S_{\mathrm{I}}} \ll \frac{z_3 z_4}{z_2} \text{ and } \frac{1}{S_{\mathrm{II}}} \ll z_2$$

so that the frequency range in which the impedance conversion according to the formula $$Z_1 = -\frac{z_3 z_4}{z_2}$$

holds good is limited.

With this reserve we find, for example, for:

$$z_3 = R \qquad z_4 = jL\omega$$

and $$z_2 = \frac{1}{jC\omega} \qquad Z_1 = RLC\omega^2$$

for:

$$z_3 = R \qquad z_4 = \frac{1}{jC\omega}$$

and $$z_2 = jL\omega \qquad Z_1 = \frac{R}{LC\omega^2}$$

for:

$$z_3 = jL_1\omega \qquad z_4 = jL_2\omega$$

and $$z_2 = R \qquad Z_1 = \frac{L_1 L_2 \omega^2}{R}$$

and for:

$$z_3 = \frac{1}{jC_1\omega} \qquad z_4 = \frac{1}{jC_2\omega}$$

and $$z_2 = R \qquad Z_1 = \frac{1}{RC_1C_2\omega^2}$$

thus real impedances proportional to the square of the frequency or to the reciprocal or the square of the frequency. Furthermore we find for:

$$z_3 = jL_1\omega \qquad z_4 = jL_2\omega$$

and $$z_2 = \frac{1}{jC\omega} \qquad Z_1 = \frac{1}{jC_1C_2L\omega^3}$$

and for:

$$z_3 = \frac{1}{jC_1\omega} \qquad z_4 = \frac{1}{jC_2\omega}$$

and $$z_2 = jL\omega \qquad Z_1 = \frac{1}{jC_1C_2L\omega^3}$$

thus blind impedances proportional to the third power of the frequency or to the reciprocal of the third power of the frequency.

Such impedances may be very useful under certain conditions, for example in filter engineering. It is also possible to utilise series of parallel resonant circuits, for example with:

$$z_3 = \text{parallel resonant circuit} \frac{jL_1\omega}{1 - L_1C\omega^2}$$

and $$z_2 = jL_2w, \; z_4 = R \quad Z_1 = -\frac{RL_1}{(1 - L_1C\omega^2)L_2}$$

and with:

$$z_3 = \text{series resonant circuit} = \frac{1 - LC_1\omega^2}{jC_1\omega}$$

and $$z_2 = \frac{1}{j\omega C_2}, \; z_4 = R \quad Z_1 = \frac{R(1 - LC_1\omega^2)C_2}{C_1}$$

Numerous other combinations are, of course, also possible.

Figure 5:
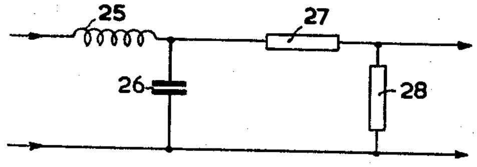
Figs. 5 and 6 show the diagram of a low-pass filter comprising two circuit arrangements according to the invention.

Fig. 5 shows, for example, the wiring diagram of a lowpass filter comprising an open stable circuit 27 of the type $Z_1 = jL_1L_2C\omega^3$ as a longitudinal element and a short-circuit stable circuit 28 of the type $$z_3 = \frac{1}{jC_1C_2L\omega^3}$$

as a transverse element.

Figure 6:
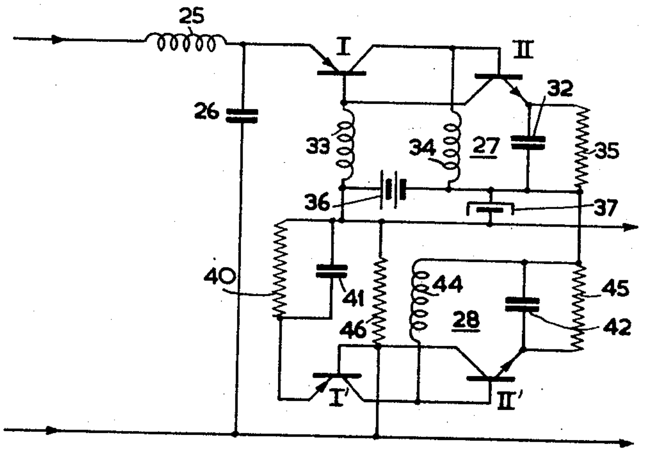

Fig. 6 shows a diagram of the same filter in which the circuits 27 and 28 are fed by a single battery 36. Since the operating conditions of the circuits 27 and 28 are fulfilled only up to a certain limiting frequency, a half T-section, comprising an inductor 25 and a capacitor 26 are connected ahead of the circuits 27 and 28.

The inductor 25 has a value $$\tfrac{1}{2}L_k = \frac{R}{2\pi f_0}$$

wherein R is the characteristic impedance of the filter and $f_0$ is the cut-off frequency. The value of the capacitor 26 is $$C_K = \frac{1}{\pi f_0 R}$$

The circuit arrangement 27 comprises a p-n-p-transistor I and an n-p-n-transistor II having their bases and collectors interconnected in a cross-wise manner and passive impedances 33 and 34, which are realised by inductances $L_1$ and $L_2$, and a passive impedance 32, realised by a capacitor C, which is shunted by a high-ohmic resistor 35. It is fed by a battery 36 which is shunted by a capacitor 37 of high capacity. The impedance $Z_1$ realised by the circuit 27 is thus equal to $jL_1L_2C\omega^3$, the values of the passive impedances $L_1L_2$ and C being so chosen that $f_0Z_1 = 2R$ at the cut-off frequency $f_0$.

The circuit arrangement 28 likewise comprises a p-n-p-transistor I' and an n-p-n-transistor II' having their bases and collectors interconnected in a cross-wise manner and passive impedances 41, 42 and 44, realised by capacitors $C_1$ and $C_2$ and an inductance L respectively. The capacitors 41 and 42 are bridged by high-ohmic resistors 40 and 45 respectively. The circuit arrangement is fed by the same battery 36 as used for the circuit arrangement 27. The impedance $z_3$ realised by the circuit arrangement 28 is equal to $$\frac{1}{jC_1C_2L\omega^3}$$

and the values of the passive impedances $L_1C_1$, $C_2$ are so chosen that $Z_3 = 2R$ at the cut-off frequency $f_0$.

The attenuation factor $\alpha$ of one filter section is given by the equation:

$$\cos h\,\alpha = \left| 1 + \frac{Z_1}{2Z_d} \right|$$

wherein $Z_1$ is the longitudinal impedance and $Z_d$ is the transverse impedance of the filter. For the $\pi$ section constituted by half of the capacity 26 and by the impedances $Z_1$ and $Z_3$ we find:

$$\cos h\,\alpha = \left| 1 - \frac{1}{2}\left(\frac{\omega}{\omega_0}\right)^6 - \frac{1}{2}\left(\frac{\omega}{\omega_0}\right)^4 \right|$$

For $\omega\ \omega_0$, $\cos h\ \alpha$ thus increases with the sixth power of $\omega$, whereas the attenuation factor of the normal $\pi$ section increases only with the square of $\omega$ in accordance with the expression:

$$\cos h\,\alpha = \left| 1 - \left(\frac{\omega}{\omega_0}\right)^2 \right|$$

It will be evident that numerous other applications of the circuit arrangements according to the invention are possible, for example in oscillators, modulators, etc. and in general in all those cases in which an impedance having a negative resistance portion may be useful. It is also to be understood that the foregoing structural data has been presented to enable ready practice of the invention and to give illustrative examples thereof, without in any way limiting the scope of the invention.

What is claimed is:

1. A circuit arrangement for converting an impedance, comprising an n-p-n-transistor and a p-n-p-transistor each having base, emitter and collector electrodes, the base electrode of each transistor being connected to the collector electrode of the other transistor, a direct-current source of supply voltage having at least one positive and one negative terminal, a first group of two pairs of terminals, one pair of said first group being included in a circuit connection between the most positive terminal of said source of supply voltage and the emitter of the p-n-p transistor and the other pair being included in a circuit connection between the most negative terminal of said source and the emitter of the n-p-n transistor, and a second group of two pairs of terminals, one pair of said second group being included in a circuit connection between a positive terminal of said source of supply voltage and the base of the p-n-p transistor and the other pair of said second group being included in a circuit connection between a negative terminal of said source and the base of the n-p-n transistor, and passive impedances connected to three of said four pairs of terminals whereby the arrangement exhibits, across the fourth pair of terminals, a converted impedance substantially independent of the characteristic magnitudes of the transistors.

2. A circuit arrangement for converting an impedance, comprising an n-p-n-transistor and a p-n-p-transistor each having base, emitter and collector electrodes, the base electrode of each transistor being connected to the collector electrode of the other transistor, a direct-current source of supply voltage having at least one positive and one negative terminal, a first group of two pairs of terminals, one pair of said first group being included in a circuit connection between the most positive terminal of said source of supply voltage and the emitter of the p-n-p transistor and the other pair being included in a circuit connection between the most negative terminal of said source and the emitter of the n-p-n transistor, and a second group of two pairs of terminals, one pair of said second group being included in a circuit connection between a positive terminal of said source of supply voltage and the base of the p-n-p-transistor and the other pair of said second group being included in a circuit connection between a negative terminal of said source and the base of the n-p-n-transistor, and passive impedances connected to three of said four pairs of terminals, the quotient of the two passive impedances connected to the emitter and the base of one of the said transistors being high with respect to the reciprocal of the base collector current gain factor of said one transistor, but small with respect to the base-collector current gain factor of the other of the said transistors and the absolute value of the impedance connected across each pair of terminals of the first group being high with respect to the emitter-base input impedance of the corresponding transistor, whereby the arrangement exhibits, across the fourth pair of terminals, a converted impedance substantially independent of the characteristic magnitudes of the transistors and equal to the reciprocal of the product of the two passive impedances connected to the two pairs of terminals of the same group, divided by the third passive impedance.

3. A circuit arrangement as claimed in claim 2, in which a load circuit is connected to the said fourth pair of terminals, said load circuit having an impedance such that the product of the resistances of the impedances connected to the first group of pairs of terminals is larger than the product of the resistances of the impedances connected to the second group of pairs of terminals.

4. A circuit arrangement as claimed in claim 2, in which said fourth pair of terminals is included between the emitter of one transistor and the corresponding pole of the source of supply, whereby the circuit is open circuit stable.

5. A circuit arrangement as claimed in claim 2, in which said fourth pair of terminals is included between the base of one transistor and the source of supply, whereby the circuit is short-circuit stable.

6. A circuit arrangement as claimed in claim 2, in which the base of one transistor is biased in the forward direction with respect to its emitter, whereby rest currents flow in the forward direction through said impedances.

7. A circuit arrangement as claimed in claim 2, wherein the one of said transistors whose base and emitter circuits each includes one of said three passive impedances has its base biased in the forward direction with respect to its emitter, whereby rest currents flow in the forward direction through said impedances and the circuit of the converted impedance comprises a source of zero biasing potential.

8. A circuit arrangement as claimed in claim 2, in which said passive impedances have a substantially resistive character, whereby the converted impedance exhibited has a negative resistance portion.

9. A circuit arrangement as claimed in claim 3, wherein at least two of the said three passive impedances are reactive impedances such that the converted impedance is proportional to the second and to the third power of the frequency respectively.

10. A circuit arrangement as claimed in claim 9, in which the two passive impedances connected to the pairs of terminals of one group are a resistance and a reactive impedance of a first kind, and the third passive impedance is a reactive impedance of the opposite kind, whereby the converted impedance is real and is dependent on the second power of the frequency.

11. A circuit arrangement as claimed in claim 9, in which the two passive impedances connected to the pairs of terminals of one group are reactive impedances of the same kind, and the third passive impedance is a resistor, whereby the converted impedance is real and is dependent on the second power of the frequency.

12. A circuit arrangement as claimed in claim 9, in which the two passive impedances connected to the pairs of terminals of one group are reactive impedances of a first kind, and the third passive impedance is a reactive impedance of the opposite kind, whereby the converted impedance is a reactive impedance of the first kind and dependent on the third power of the frequency.

13. A circuit arrangement for converting an impedance, comprising an n-p-n transistor and a p-n-p transistor each having base, emitter and collector electrodes, the base electrode of each transistor being connected to the collector electrode of the other transistor, a direct-current source of supply voltage having at least one positive and one negative terminal, a first group of two pairs of terminals, one pair of said first group being included in a circuit connection between a first positive terminal of said source of supply voltage and the emitter of the p-n-p transistor and the other pair being included in a circuit connection between a first negative terminal of said source and the emitter of the n-p-n transistor, and a second group of two pairs of terminals, one pair of said second group being included in a circuit connection between a second positive terminal of said source of supply voltage and the base of the p-n-p transistor and the other pair of said second group being included in a circuit connection between a second negative terminal of said source and the base of the n-p-n transistor, the potentials of said second positive and negative terminals being intermediate the potentials of said first positive and negative terminals, and passive impedances connected to three of said four pairs of terminals whereby the arrangement exhibits, across the fourth pair of terminals, a converted impedance substantially independent of the characteristic magnitudes of the transistors.

References Cited in the file of this patent

UNITED STATES PATENTS

| | | |
|---|---|---|
| 2,769,908 | Stansel | Nov. 6, 1956 |

FOREIGN PATENTS

| | | |
|---|---|---|
| 536,583 | Great Britain | May 20, 1941 |